No. 696,424. Patented Apr. 1, 1902.
V. J. EMERY.
WATER SUPPLY APPARATUS FOR WATER CLOSETS.
(Application filed May 7, 1900. Renewed Jan. 5, 1901.)
(No Model.) 2 Sheets—Sheet 1.
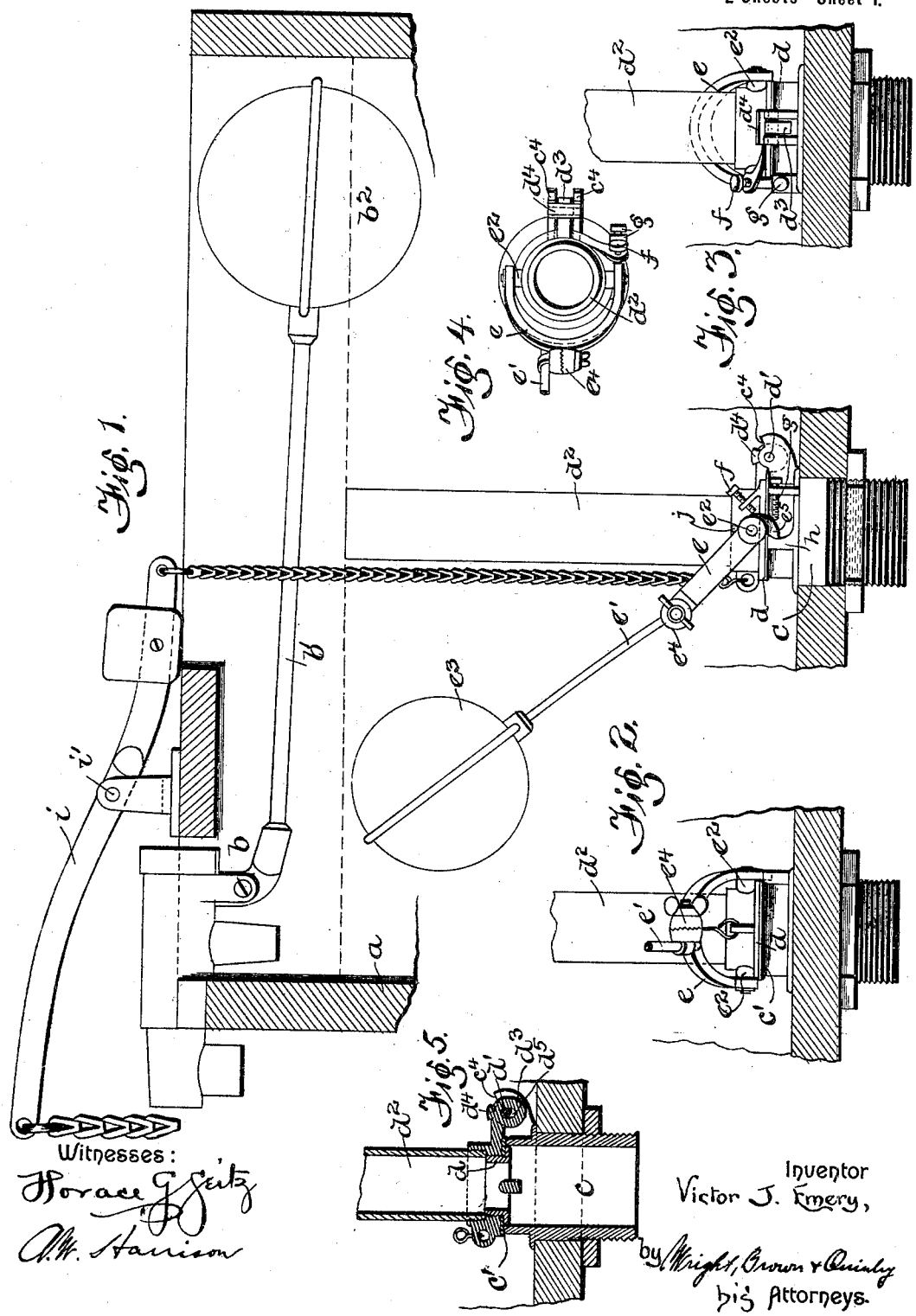
Witnesses:
Horace G. Seitz
A. W. Harrison
Inventor
Victor J. Emery,
by Wright, Brown & Quinby
his Attorneys.

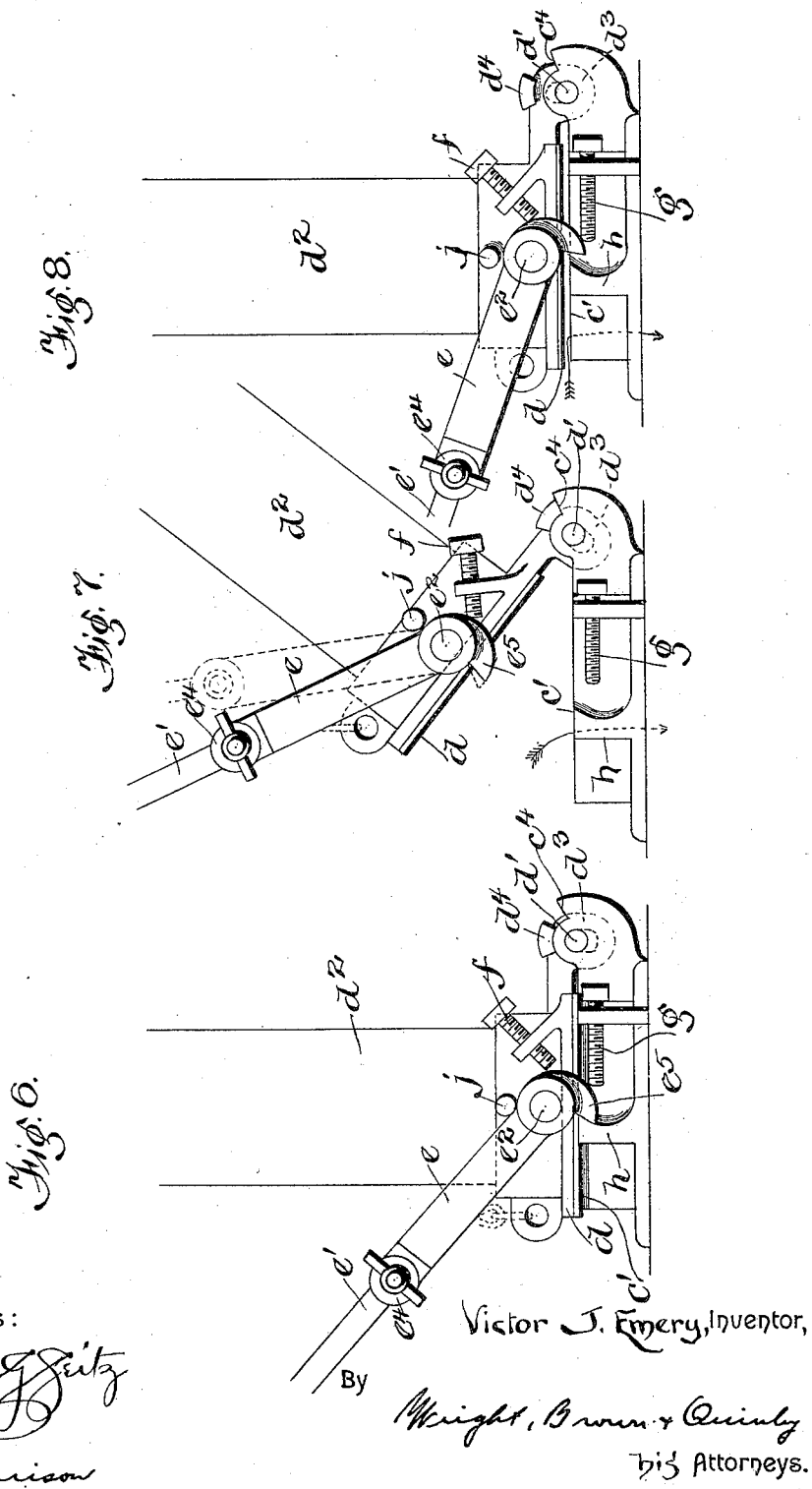

UNITED STATES PATENT OFFICE.

VICTOR J. EMERY, OF WOLLASTON, MASSACHUSETTS.

WATER-SUPPLY APPARATUS FOR WATER-CLOSETS.

SPECIFICATION forming part of Letters Patent No. 696,424, dated April 1, 1902.

Application filed May 7, 1900. Renewed January 5, 1901. Serial No. 42,243. (No model.)

*To all whom it may concern:*

Be it known that I, VICTOR J. EMERY, of Wollaston, in the county of Norfolk and State of Massachusetts, have invented certain new and useful Improvements in Water-Supply Apparatus for Water-Closets, of which the following is a specification.

This invention relates to water-supply apparatus for water-closets, comprising a tank having an outlet which discharges into the closet-bowl, a valve controlling said outlet and adapted to be opened by a pull device in the closet suitably connected with the valve, and an inlet having a float-controlled admission-valve or ball-cock which is opened by the subsidence of water following the opening of the outlet-valve and closed by the rise of water following the closing of the outlet-valve.

The invention has for its object, first, to provide simple and effective automatic means governed by the fall of water in the tank for closing the outlet-valve.

The invention also has for its object to enable the closing movement of the outlet-valve to be arrested before the valve is seated and completed after the water commences to rise in the tank, thus providing for a retarded flow (adapted to fill the trap of the closet-bowl) until after the water commences to accumulate in the tank, the outlet being then entirely closed.

The invention also has for its object to enable the outlet-valve to be locked to its seat by the accumulation of water in the tank.

To these ends the invention consists in the improvements which I will now proceed to describe and claim.

Of the accompanying drawings, forming a part of this specification, Figure 1 represents a side elevation of a supply apparatus embodying my invention, the tank being shown in section with portions broken away. Figs. 2 and 3 represent front and rear elevations of portions of the apparatus shown in Fig. 1. Fig. 4 represents a top view, and Fig. 5 a sectional view, of the apparatus shown in Figs. 2 and 3. Figs. 6, 7, and 8 represent side views on a somewhat larger scale, showing the valve in different positions.

The same reference characters indicate the same parts in all the figures.

In the drawings, $a$ represents the supply-tank, and $b$ represents the float-controlled inlet, this comprising what is commonly known as a "ball-cock," the lever $b'$ of which is provided with a float $b^2$. This ball-cock is opened when the float falls by reason of the subsidence of water in the tank and is closed when the float is raised by an accumulation of water in the tank.

$c$ represents the outlet of the tank, the same being surrounded by a valve-seat $c'$, suitably affixed to the bottom of the tank.

$d$ represents the valve, which is mounted to swing on a hinge-rod $d'$ and is preferably of annular form, adapted to close on the seat $c'$ and extended upwardly in the form of a stand-pipe $d^2$, which is open at the top to permit any excess of water that may accumulate in the tank to overflow through the standpipe and valve to the outlet. The valve is provided with an ear $d^3$, through which the pivot-pin $d'$ passes, the said ear having a stop member or shoulder $d^4$, which abuts against a complemental stop member or shoulder $c^4$, adjacent to the valve-seat, and limits the opening movement of the valve, as shown in Fig. 7.

$e$ and $e'$ are parts or sections of a lever which is fulcrumed at $e^2$ to the valve and is provided with a float $e^3$. The part $e$ is bifurcated, as shown in Fig. 4, its ends being mounted on two fulcrum-studs $e^2$ $e^2$ at opposite sides of the valve. The part $e'$ is connected to the part $e$ by means of an adjustable joint $e^4$, which permits the parts $e$ and $e'$ to be adjusted so as to stand either in alinement with each other or at any desired angle. The parts $e$ and $e'$ constitute the longer arm of a lever, which has also a shorter arm $e^5$, which as here shown is formed on one of the branches of the part $e$.

$f$ represents a stop fixed to the valve $d$ and arranged to coöperate with the lever-arm $e^5$ in causing the weight of the lever and the float $e^3$ to close the valve, as hereinafter described.

$g$ represents a fixed stop adjacent to the valve-seat and arranged to coöperate with the lever-arm $e^5$ in arresting the closing movement of the outlet-valve before the latter reaches its seat to cause a retarded flow of water through the outlet after the main flushing-flow, as hereinafter described.

$h$ represents a fixed locking member adjacent to the valve-seat and arranged to coöperate with the lever-arm $e^5$ in locking the outlet-valve to its seat when the float $e^3$ is raised by an accumulation of water in the tank, as hereinafter described.

The operation of the above-described apparatus is as follows: When the tank is filled and the outlet-valve closed, the float $e^3$ is wholly or mainly submerged in the water of the tank. When it is desired to liberate water from the tank, the valve is opened by a suitable pull device connected with the outlet-valve by a suitable connecting means, including a lever $i$, fulcrumed at $i'$ on the tank and connected at one end with the pull device and at the other end with the valve. This movement of the valve inclines the standpipe $d^2$ and allows the float-lever connected to the valve to rise, the float $e^3$ being arranged so that it will be supported by the water and will hold the valve open so long as the water-level in the tank remains at its normal height. There is or may be a stop $j$ on the valve, arranged to engage the part $e$ of the lever to hold the lever in the position indicated by dotted lines in Fig. 7 when the valve is open to its fullest extent. When the lever is in contact with the stop $j$, its shorter arm $e^5$ is separated from the stop $f$. As the water subsides in the tank the float-lever on the outlet-valve swings downwardly, and when it reaches the position shown by full lines in Fig. 7 it abuts against the stop $f$, and thereafter the weight of the float $e$ and its connections with the valve causes the float to force the valve toward its seat, this movement continuing until the lower end of the shorter arm $e^5$ strikes the stop $g$. The contact of the arm $e^5$ with the stop $g$ arrests the closing movement of the valve before the latter reaches its seat, thus providing a limited opening between the valve and its seat, as shown in Fig. 8, which opening permits a slow or retarded flow of water through the outlet, this flow being sufficient to fill the trap of the closet after the siphoning effect, due to the flushing-flow while the outlet was fully opened, has ceased. The valve remains in the position shown in Fig. 8 until the water which is now being admitted into the tank by the ball-cock $b$ rises sufficiently to raise the longer arm of the lever $e\ e'$ by means of the float $e^3$ and correspondingly depress the shorter arm $e^5$ until the latter slides away from the stop $g$, as shown in Fig. 6, thus permitting the valve to close upon its seat. The ear $d^3$ of the valve is preferably provided with a slot $d^5$ to give the valve a loose movement upon the fulcrum-pin $d'$.

$h$ represents a fixed locking member which is formed to engage one side of the shorter arm $e^5$ when the latter is moved away from the stop $g$, as above described, the engagement of the arm $e^5$ with the locking member $h$ locking the valve to its seat, as indicated in Fig. 6. The engaging faces of the locking member $h$ and arm $e^5$ are so formed that they do not interfere with the opening of the valve by the pull device.

The stop $f$ is preferably a screw mounted in a tapped ear on the valve, so that it may be adjusted relatively to the arm $e^5$ to vary the extent of movement of the float-lever from its extreme upward position (shown in dotted lines in Fig. 7) to its position of engagement with the stop $f$, thus causing the float-lever to close the valve more or less quickly and regulate the duration of the flushing-flow. The stop $g$ is also preferably a screw working in an internally-threaded ear, so that it may be adjusted to cause the arm $e^5$ to slide out of engagement with it more or less quickly, thus varying the duration of the retarded flow while the valve is in the position shown in Fig. 8.

I do not limit myself to the employment of the locking member $h$, as the coöperation of the arm $e^5$ with the stops $f$ and $g$, as above described, is not dependent upon the said locking member.

The stop $j$ may be omitted in case the water does not rise in the tank high enough to prevent the float-lever $e\ e'$ from swinging downward and coöperating with the stop $f$ when the water is falling, it being obvious that if the water in the tank does not raise the said float-lever higher than the position shown in dotted lines in Fig. 7 when the valve is opened the lever will swing downwardly from said position and engage the stop $f$ when the water falls sufficiently.

I claim—

1. A water-supply apparatus comprising a tank having an outlet surrounded by a valve-seat, a hinged valve controlling the outlet, means for opening the valve, a lever having a short arm and fulcrumed on the valve-body at a point between the hinge and the outer or swinging end of the valve and having a float on its longer arm, and a stop on the valve-body arranged to constitute an abutment for the short arm of the lever, the arrangement of the short arm and stop being such that the weight of the lever and float is borne by the valve when the latter is open, and means for preventing the buoyancy of the float from opening the valve.

2. A water-supply apparatus comprising a tank having an outlet surrounded by a valve-seat, a hinged valve controlling the outlet, means for opening the valve, a lever fulcrumed to the valve and having a float on its longer arm, and a stop on the valve arranged to coöperate with the lever in causing the lever to close the valve while the water is subsiding in the tank, said stop being adjustable to vary the action of the lever in closing the valve.

3. A water-supply apparatus comprising a tank having an outlet surrounded by a valve-seat, a hinged valve controlling the outlet, means for opening the valve, a lever fulcrumed to the valve and having a float on its longer arm, and a locking member movable by said float, a stop on the valve arranged to coöperate with the lever in causing the lever to close the valve while the water is subsiding in the tank, and a fixed locking member adjacent to the valve-seat and formed to interlock with the locking member on the lever when the float is raised by the rise of water caused by the closing of the valve.

4. A water-supply apparatus comprising a tank having an outlet surrounded by a valve-seat, a hinged valve controlling the outlet, a lever fulcrumed to the valve and having a float on its longer arm and a cam-shaped shorter arm, a stop on the valve arranged to coöperate with the lever in causing the lever to close the valve when the water subsides in the tank, and a fixed stop adjacent to the valve-seat, said cam-shaped arm and fixed stop being arranged relatively to each other and to the lever to arrest the closing movement of the valve before the latter reaches its seat, thereby causing a retarded flow through the outlet until the longer arm of the lever is raised by the rise of water in the tank during said retarded flow, and to then permit the closing of the valve.

5. A water-supply apparatus comprising a tank having an outlet surrounded by a valve-seat, a hinged valve controlling the outlet, a lever fulcrumed to the valve and having a float on its longer arm and a cam-shaped shorter arm, a stop on the valve arranged to coöperate with the lever in causing the lever to close the valve when the water subsides in the tank, and a fixed stop adjacent to the valve-seat, said cam-shaped arm and fixed stop being arranged relatively to each other and to the lever to coöperate as described in first arresting and then permitting the completion of the closing movement of the valve, the said fixed stop being adjustable to vary the period of said retarded flow.

6. A water-supply apparatus comprising a tank having an outlet surrounded by a valve-seat, a hinged valve controlling the outlet, means for opening the valve, a lever fulcrumed to the valve and having a float on its longer arm, a stop $j$ on the valve, arranged to limit the independent upward movement of the lever and cause the float thereof to hold the valve open while the float is supported by water in the tank, and a stop $f$ on the valve, arranged to limit the independent downward movement of the valve and cause the float to close the valve when the water subsides in the tank.

In testimony whereof I have affixed my signature in presence of two witnesses.

VICTOR J. EMERY.

Witnesses:
C. F. BROWN,
A. D. HARRISON.